US011676027B2

(12) United States Patent
Baker et al.

(10) Patent No.: US 11,676,027 B2
(45) Date of Patent: Jun. 13, 2023

(54) CLASSIFICATION USING HYPER-OPINIONS (71) Applicant: Raytheon Company, Waltham, MA (US)

(72) Inventors: Suzanne M. Baker, Lincoln, MA (US); Matthew L. Campbell, Billerica, MA (US); Thomas T. Parsons, Woburn, MA (US)

(73) Assignee: Raytheon Company, Waltham, MA (US)

( * ) Notice: Subject to any disclaimer, the term of this patent is extended or adjusted under 35 U.S.C. 154(b) by 652 days.

(21) Appl. No.: 16/710,329

(22) Filed: Dec. 11, 2019

(65) Prior Publication Data
US 2021/0182631 A1 Jun. 17, 2021

(51) Int. Cl.
*G06N 3/084* (2023.01)
*G06N 20/10* (2019.01)
*G06F 18/2415* (2023.01)
*G06F 18/2431* (2023.01)

(52) U.S. Cl.
CPC ......... *G06N 3/084* (2013.01); *G06F 18/2415* (2023.01); *G06F 18/2431* (2023.01); *G06N 20/10* (2019.01)

(58) Field of Classification Search
CPC .......... G06N 20/10; G06N 3/084; G06N 3/02; G06K 9/6277; G06K 9/628
See application file for complete search history.

(56) References Cited

U.S. PATENT DOCUMENTS

| 2019/0130257 | A1* | 5/2019 | Meyerson ............ G06N 3/0481 |
| 2020/0143252 | A1* | 5/2020 | Dasgupta ............. G06N 3/0481 |
| 2021/0073631 | A1* | 3/2021 | Kadayam Viswanathan ............... G06K 9/6259 |

FOREIGN PATENT DOCUMENTS

WO  WO-2021119282 A1  6/2021

OTHER PUBLICATIONS

"International Application Serial No. PCT/US2020/064261, International Search Report dated May 21, 2021", 3 pgs.
"International Application Serial No. PCT/US2020/064261, Written Opinion dated May 21, 2021", 7 pgs.
Armin, Askari, et al., "Lifted Neural Networks", Arxiv.Org' Cornell University Library, 201 Olin Library Cornell University Ithaca, NY 14853, (May 3, 2018), 10 pgs.
Josang, Audun, et al., "Uncertainty Characteristics of Subjective Opinions", 21st International Conference On Information Fusion, (Jul. 10, 2018), 1998-2005.
Xujiang, Zhao, et al., "Uncertainty Aware Semi-Supervised Learning on Graph Data", arXIv:2010.12783v2, (Nov. 25, 2020), 27 pgs.
(Continued)

*Primary Examiner* — Margaret G Mastrodonato
(74) *Attorney, Agent, or Firm* — Schwegman Lundberg & Woessner, P.A.

(57) ABSTRACT

Systems, devices, methods, and computer-readable media for determining a hyper-opinion classification of an object. A method can include receiving data of an object to be classified, and determining, using a neural network, a hyper-opinion classification of the object including an indication of the probabilities of base classes and composite classes that are "or" combinations of proper subsets of the base classes.

20 Claims, 8 Drawing Sheets

(56) References Cited

OTHER PUBLICATIONS

Josang, Audun, "Subjective Logic, A Formalism for Reasoning Under Uncertainty (Artificial Intelligence: Foundations, Theory, and Algorithms)", Chapter 2 Elements of Subjective Opinions, Springer International Publishing, (2016), 7-18.

Josang, Audun, "Subjective Logic, A Formalism for Reasoning Under Uncertainty (Artificial Intelligence: Foundations, Theory, and Algorithms)", Chapter 3 Opinion Representations, Springer International Publishing, (2016), 19-50.

Sensoy, M, et al., "Evidential Deep Learning to Quantify Classification Uncertainty", 32nd Conference on Neural Information Processing Systems, arXiv:1806.01768, (2018), 12 pgs.

"International Application Serial No. PCT/US2020/064261, International Preliminary Report on Patentability dated Jun. 23, 2022", 9 pgs.

\* cited by examiner

CLASSIFICATION USING HYPER-OPINIONS

BACKGROUND

Deep learning is a powerful technique in machine learning (ML). Deep learning has been applied to a variety of applications. These applications include autonomous driving, computer vision, and healthcare, to natural language processing, and radar detection, among many others. While deep learning has demonstrated acceptable performance in these fields, quantifying uncertainty and preventing overconfident decisions remains a universal challenge and active area of research.

Standard deep learning architectures give point estimates for model predictions, and do not provide a direct estimate for uncertainty. These architectures typically use nontransparent techniques that indirectly measure uncertainty.

Bayesian approaches can estimate variance uncertainty in both model parameters and predictions. Uncertainty estimates can be determined using Bayesian Neural Networks (BNN) or stochastic regularization techniques, such as dropout and deep ensembles. The BNN approach estimates uncertainty through moment matching on the approximate posterior distribution and the other techniques use variants of ensemble averaging. While the Bayesian approach can be useful for a few applications, the computational complexity and resources required to use the Bayesian approach is not feasible for time-sensitive tasks or computationally limited devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments relate to classification using a deep neural network (NN) architecture. The classification can include an "uncertain" metric, a class for one or more proper subsets of classes, base classes individually, or the like. Embodiments can provide classification using hyper-opinions. Embodiments are an extension of multinomial opinions and provide improved accuracy and increased resolution of uncertainty compared to multinomial opinions. Multinomial opinions is described in M. Sensoy, M. Kandemir, and L. Kaplan, "Evidential Deep Learning to Quantify Classification Uncertainty", arXiv:1806.01768 (2018).

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processing circuitry operating on a computer system, such as a personal computer, server or other computer system, turning such computer system into a specifically programmed machine. The functions or algorithms may be implemented using other processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many feed-forward NNs are represented as matrices of weights coupled with nonlinear transformations that correspond to the modeled connections. Inspired by biological neural nets, NNs operate by accepting data into a set of input neurons that often have many outgoing connections to other neurons. At each traversal between neurons, the corresponding weights and nonlinear transformation modify the input from the former layer and cause the neurons in the subsequent layer to activate (i.e. "fire"). This process continues until an output layer of neurons is reached; the values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. A training process generally proceeds by selecting initial weights, which may be randomly selected. Training data is fed into the NN and results are compared to an objective function that provides an indication of error. The error indication is a measure of how wrong the NN's result is compared to an expected result. This error can then be used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight can move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, or the like.

Embodiments provide an approach for obtaining uncertainty estimates for classification using hyper-opinions. Hyper-opinions are partially related to A. Josang, "Subjective Logic, A Formalism for Reasoning Under Uncertainty," Artificial Intelligence: Foundations, Theory, and Algorithms, Springer International Publishing (2016). As previously discussed, embodiments are an extension of a recent work called multinomial opinions. Embodiments adapt multinomial opinions for deep learning to calculate uncertainty estimates for image classification. Embodiments provide improved accuracy and increased resolution of the state of uncertainty over prior techniques. Further, embodiments provide the only existing method that can classify into composite classes with the logical "or" (e.g., class A OR B) with a single classifier and at the same hierarchy as base classes for three or more bases classes. A base class is an individual class, such as A, B, C. While "OR" classification can be achieved using binary relevance, binary relevance requires a separate classifier for each label in a one-versus all approach, cannot capture correlations, and cannot simultaneously predict the base classes at the same hierarchy level as the "or" classes.

An example application of embodiments can include command and control. At the heart of command and control, those in command need to make clear decisions with limited time and resources. Embodiments herein, sometimes called hyper-opinions, can greatly assist the commanders. Embodiments provide high accuracy and a direct measurement of uncertainty. The direct measurement of uncertainty can help prevent over-confident decisions. Embodiments also provide hierarchical levels of uncertainty between class combinations, further aiding the warfighter in making engagement decisions. As an example, assuming three classes {unmanned aerial vehicle (UAV), small plane, large plane}, an engagement decision may differ between {UAV or small plane} in comparison to {small plane or large plane}. Embodiments make that decision clearer and allow for faster decision-making as compared to other solutions. Therefore, embodiments provide the potential to reduce mission failure and help manage resources effectively, among many other applications.

Additionally, outputs of embodiments natively allow for probability fusion between sources that neither lend themselves to feature-based fusion nor provide the same base class structure. This effectively allows embodiments to avoid the Ellsberg paradox during fusion, and provides a structure for a chaotic C5 architecture. Thus, multiple sensors, potentially created by different companies, can be used in a single environment, but be trained to look at different sets of subclasses. For example a first sensor can distinguish between objects {A, B, C}, whereas a second sensor can distinguish between objects {A, B or C} only. Fusing that information using a Bayes process results in the Ellsberg paradox.

As previously discussed, embodiments build on multinomial opinions and subjective logic. In subjective logic, an opinion, $\omega=(b,u,a)$ depends on a set of belief masses b, uncertainty u, and base rates a for a set of classes in a domain. The belief masses and uncertainty are defined on a simplex, $$\sum_{i=1}^{k} b_i + u = 1$$

where k is the number of classes in the set. Belief masses and uncertainty relate to the observational evidence e for each class. The set of base rates a describe the acceptance rate for each class prior to receiving any evidence. It also represents a projection vector, mapping uncertainty onto probability.

Subjective Logic features two different representations: Multinomial Opinions (MO) and Hyper-Opinions (HO). Each representation depends on the domain of classes considered for the problem. Consider a set of N base classes $\mathbb{X} = \{x_1, x_2, \ldots, x_N\}$. The hyper-domain is defined as the reduced power-set $\mathcal{R}(\mathbb{X})$ of $\mathbb{X}$, $\mathcal{R}(\mathbb{X}) = 2^{\mathbb{X}} \setminus \{\emptyset, \{\mathbb{X}\}\} = \{x_1, x_2, \ldots, x_N, \{x_1, x_2\}, \{x_1, x_3\}, \ldots, \{x_1, x_2, x_3\}, \ldots\}$.

The reduced power-set contains the base classes X and composite classes, defined as the union (e.g., logical "or") of two to N−1 base classes. The total number of classes in the hyper-domain for N base classes is $k=2^N-2$. While the relevant domain for multinomial opinions is defined only over base classes X, hyper-opinions are defined over the entire hyper-domain.

The probability distribution for each class in $\mathcal{R}(\mathbb{X})$ can be given by a Dirichlet distribution, $$D(p|\alpha) = 1/B(\alpha) \prod_{i=1}^{k} p_i^{\alpha_i - 1}, \sum_{i=1}^{k} p_i = 1$$

Here the Dirichlet parameters $\alpha_i$ depend on the observation evidence $e_i$, base rate $a_i$ and prior information W, $\alpha_i = e_i + W a_i$. In embodiments, W=N (for simplicity) and a uniform prior for the base rates. For N base classes $\mathbb{X} = \{x_1, x_2, \ldots, x_N\}$, the base rates for all classes in the entire hyper-domain, $$a_i = \sum_{\substack{x_j \subseteq x_i \\ x_i \subseteq \mathcal{R}(\mathbb{X})}} \frac{1}{N} = \left( \frac{1}{N}, \frac{1}{N} \ldots \frac{2}{N}, \frac{2}{N}, \ldots \frac{N-1}{N} \right)$$

Essentially, the numerator of each base rate equals the number of base classes within each composite class.

The Dirichlet strength can be defined as $$S = \sum_{i=1}^{k} \alpha_i = \sum_{i=1}^{k} e_i + N a_i,$$

which relates to the total observational evidence. The Dirichlet distribution becomes increasing localized with increasing S. The normalization factor in the Dirichlet distribution is the multivariate Beta distribution, $$B(\alpha) = \prod_{i=1}^{k} \Gamma(\alpha_i)/\Gamma(S)$$

Hyper-opinions treats each class—including the composite classes, as statistically independent. Therefore, it is not a true probability distribution after restoring the dependence of the composite classes on the base classes $\mathbb{X}$. As discussed elsewhere, assuming statistical independence for the composite classes presents a challenge for the deep learning implementation that is not present in the multinomial opinion implementation.

The mapping between the Dirichlet strength, belief masses, and uncertainty can be defined as $$b_i = e_i/S$$

$$u = N/S \sum_{i=1}^{k} a_i \sim N/S$$

The first expression describes that belief increases with increasing evidence. The second expression describes that uncertainty decreases with increasing evidence (e.g., increasing S). This intuitively makes sense because one should have a stronger belief in a class and less uncertainty when there more evidence towards that class. Additionally, the uncertainty increases with increasing number of base classes N. A larger number of base classes should increase the overall level of uncertainty because there are simply more classes to choose from. This is especially apparent when the amount of evidence towards all classes is low.

For base rates with a uniform prior, the dependence of uncertainty on the number of bases classes is, $$u = \frac{N}{S} \sum_{i=1}^{k} a_i \xrightarrow{\text{uniform prior}} u = \frac{N}{SN} \sum_{i=1}^{N-1} i \binom{N}{i} = \frac{N(2^{N-1} - 1)}{S}$$

$$\xrightarrow{\text{uniform prior}} S = N(2^{N-1} - 1) + \sum_{i=1}^{k} e_i$$

$$\hat{p}_j = \mathbb{E}_{p \sim D(p|\alpha)}[p_j] = -\int dp(p_j) \frac{1}{B(\alpha)} \sum_{i=1}^{k} p_i^{\alpha_i - 1} = \frac{\alpha_j}{S}$$

$$\sigma_j^2 =$$

$$\mathbb{E}_{p \sim D(p|\alpha)}[(p_j - \hat{p}_j)^2] = -\int dp(p_j - \hat{p}_j)^2 \frac{1}{B(\alpha)} \sum_{i=1}^{k} p_i^{\alpha_i - 1} = \frac{\alpha_j(S - \alpha_j)}{S^2(S+1)}$$

The expected probabilities and their corresponding variances are $$\hat{p}_j = \mathbb{E}_{p \sim D(p|\alpha)}[p_j] = -\int dp(p_j) \frac{1}{B(\alpha)} \prod_{i=1}^{k} p_i^{\alpha_i - 1} = \frac{\alpha_j}{S}$$

$$\sigma_j^2 \mathbb{E}_{p \sim D(p|\alpha)}[(p_j - \hat{p}_j)^2] = -\int dp(p_j - \hat{p}_j)^2 \frac{1}{B(\alpha)} \prod_{i=1}^{k} p_i^{\alpha_i - 1} =$$

$$\frac{\alpha_j(S - \alpha_j)}{S^2(S+1)}$$

Figure 1:
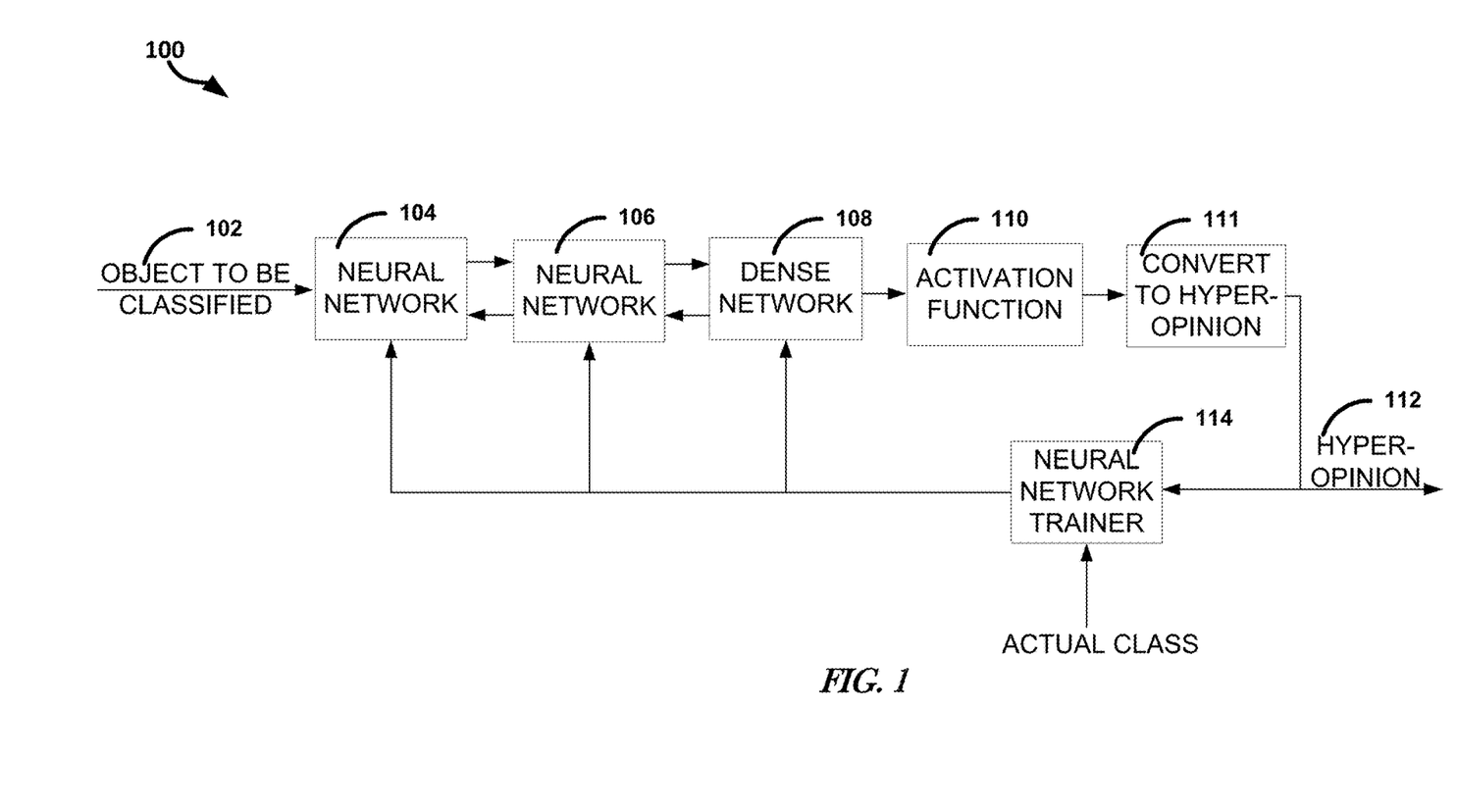
FIG. 1 illustrates, by way of example, a diagram of an embodiment of a neural network system for providing a hyper-opinion.

The expected probabilities and variances can be used in the cost function of a neural network trainer (see FIG. 1). The expected probabilities are the hyper-opinion vector (hyper-opinion 112) of the neural net. The uncertainty can be determined based on an equation provided previously.

FIG. 1 illustrates, by way of example, a diagram of an embodiment of a neural network system 100 for providing a hyper-opinion. The system 100 as illustrated includes an object to be classified 102, one or more neural networks 104, 106, a dense network 108, an activation function layer 110 (e.g., a soft+ output layer or other activation function), a convert to hyper-opinion network 111, a hyper-opinion 112, and a neural network trainer 114. Note that the neural network trainer 114 is only used to determine the weights of neurons of the neural networks of the system 100 and is not used after the neural network is deployed for classification.

The object to be classified 102 can be an image, file, document, packet, data stream, table of data, or the like. The object to be classified 102 can be provided to the neural network 104. The neural network 104 can identify or extract one or more features of the object to be classified.

The neural network 104, 106 can include a fully or partially convolutional NN, a deep convolutional network with a dilated convolution, a deep convolutional network with a residual block or densely connected convolutional block, a convolutional architecture with an auto-encoder, a U-Net convolutional architecture (e.g., with a skip connection), a generative adversarial network (GAN) architecture, a Siamese network architecture, a long short-term memory (LSTM) network architecture, or a recurrent convolutional network architecture, among others. A fully convolutional architecture includes an NN composed of convolutional layers without any fully connected layers or a multi-layer perceptron (MLP). A partially convolutional architecture includes an NN in which overall image dimensions decrease nearer an output layer until all features are flattened to a vector. The dimension decrease can be provided using max pooling layer, or the like. It is common to refer to what is called a partially convolutional NN herein as a convolutional NN. A deep convolutional NN is a convolutional NN with more than two NN layers. A dilated convolution integrates a more global context into, for example, object detection or segmentation. In dilated convolutional networks, a dilation factor is greater than one and usually increases linearly or exponentially at each layer for faster growth of the receptive field of the network. A difference between a dilated convolutional NN and a normal convolutional NN is that the dilation factor for a normal convolutional NN is 1. The receptive field is how many pixels have contributed some information to single neuron in a network. Neurons that are in deeper layers of an NN usually have a larger receptive field because a larger section of the input image has been used in the computation of that neuron. A dilated convolutional NN is completely convolutional (unlike max pooling) and allows for just as much, if not more, receptive field growth. In a network with a GAN architecture, a neural network tries to generate new data that has statistics that are the same as the training data. For example, trained to generate images can generate new photographs that look, at least superficially, authentic. A Siamese network architecture uses the same weights while working in tandem on two different input vectors to compute comparable output vectors. Often one of the output vectors is precomputed, thus forming a baseline against which the other output vector is compared. This is similar to comparing fingerprints, but can be described more technically as a distance function for locality-sensitive hashing. An LSTM network architecture is a type of recurrent neural network that has feedback connections. A common LSTM unit is composed of a cell, an input gate, an output gate and a forget gate. The cell remembers values over arbitrary time intervals and the three gates regulate the flow of information into and out of the cell.

The dense network 108 is sometimes called a fully connected layer. In the dense network 108 all neurons are connected to all neurons in a next layer. The dense network 108 performs the discriminative learning. The dense network 108 learns weights that can be used to identify from the extracted features, by the soft+ output layer 110, the proper hyper-opinion 112.

The output from neural network 104, 106 represents features in the object to be classified 102. That output could be flattened and connected to the output layer, but that architecture does not consider non-linear combinations of the features. Adding the dense network 108 can provide non-linear combinations of the features. The neural networks 104, 106 can provide a low-dimensional, and somewhat invariant feature space, and the dense network 108 can learn a (possibly non-linear) function in that space. Note that a model could use a support vector machine (SVM) or the like, in place of the dense network 108, but using the dense network 108 provides an end-to-end trainable network.

The activation function 110 is an analytic function, such as a soft+ or other activation function. A soft+ function smoothly maps the output from the dense network 108 to a number in the range $(0, \infty)$. The input to the activation function 110 can be any real number. The output of the activation function 110 is a function $f_i(\theta)$ of the model parameters $\theta$ and equates to the evidence $e_i$, where i refers to the i-th object to be classified 102. A convert to hyper-opinion function 111 can determine Dirichlet parameters from output of the activation function 110, $$\alpha_{i,j} = e_{i,j} + N a_{i,j} = f_{i,j}(\theta) + N a_{i,j}$$

where "j" refers to the j-th component of each quantity. The expected probabilities $\hat{p}_{i,j} = \alpha_{i,j}/S$ for each class of the object to be classified 102 can then be calculated from the evidence, by the convert to hyper-opinion function 111, to form the hyper-opinion 112.

The hyper-opinion 112 is a vector that indicates the probabilities of each base class and one or more combinations of base classes. For example, consider the hyper-opinion 112 for four base classes, A, B, C, D. For four base classes, the probabilities correspond to [{A}, {B}, {C}, {D}, {A or B}, {A or C}, {A or D}, {B or C}, {B or D}, {C or D}, {A or B or C}, {A or B or D}, {A or C or D}, {B or C or D}]. For three base classes, A, B, C, the probabilities correspond to [{A}, {B}, {C}, {A or B}, {A or C}, {B or C}].

The cost function used by the neural network trainer 114 to train the neural network can include a least squares component, $L_{LS}$, an entropy component, $L_{ent}$, a KL-divergence component, $L_{KL}$, or a penalty for selecting uncertainty over the relevant composite classes, $L_u$. In embodiments that include all four components, the loss can be $$L_{tot,i} = L_{LS,i} + L_{ent,i} + L_{KL,i} + L_{u,i}$$

The least squares component, $L_{LS}$, of this function can be defined as $$L_{LS,i} = \sum_j \lambda_j \int dp_i (y_{i,j} - p_{i,j})^2 D(P_i|\alpha_i) = \sum_j \lambda_j \left[(y_{i,j} - \hat{p}_{i,j})^2 + \sigma_{i,j}^2\right]$$

where $y_{i,j}$ is the target vector, $\hat{p}_{i,j}$ is the expected probability, $\sigma_{i,j}^2$ is the expected variance, and $\lambda_j = [0,1]$ is a scalar that weights the cost according to the level of the class (e.g., base, composite with two classes, etc. . . . ). In general, optimum results can be realized by setting the scalar $\lambda_j$ to a smaller value for the composite classes than the base classes. This emphasizes the cost for evidence in the incorrect base class or lack of evidence in the correct base class. Consequently, this choice prioritizes the probability mass to distribute to the base classes over the composite classes. Setting $\lambda=1$ for all the base classes and $\lambda=0$ for all of the composite classes reproduces the least squares component in multinomial opinions. This corresponds to eliminating the cost for any evidence in the composite classes, and the probability mass consequently distributes to only the base classes.

In multinomial opinions, the target vector is one-hot encoded using the relevant base classes. For embodiments herein, using the same approach would include training examples of the composite classes due, at least in part, to the assumed statistical independence of all classes in the hyper-domain. However, this may not be feasible or logical for a general dataset. For example, in the modified national institute of standards and technology (MNIST) dataset this would require creating training images of "1 or 2" or "4 or 5." However, the images created would need to be structurally different from each of the individual numbers to avoid overlap with the base classes.

Instead, of one-hot encoding, embodiments can use a target vector that restores the dependence of the composite classes on the base classes. As an example, the target vector for N=3 can be $$y_i = \begin{array}{cccccc} x_1 & x_2 & x_3 & x_1 \text{ or } x_2 & x_1 \text{ or } x_3 & x_2 \text{ or } x_3 \\ 1 & 0 & 0 & 1/2 & 1/2 & 0 \\ 0 & 1 & 0 & 1/2 & 0 & 1/2 \\ 0 & 0 & 1 & 0 & 1/2 & 1/2 \end{array}$$

In the example provided, the denominator for the composite classes (e.g., $x_1$ or $x_2$, $x_1$ or $x_3$, etc.) in $y_i$ equals, by way of example, the number of base classes within each composite class. Note that the zero elements in the target vector occur for the incorrect base classes and all of the composite classes that do not contain the base class. Note that the one hot encoding of the composite classes are not required to be ½, but sum to 1 across each cardinality.

The entropy component, $L_{ent}$, in the cost function can be defined as $$L_{ent,i} = \lambda_e \sum_j \mathbb{E}_{p \sim D(p|\alpha)}[-p_{i,j} \log p_{i,j}] =$$

$$-\lambda_e \int dp(p_{i,j} \log p_{i,j}) \frac{1}{B(\alpha)} \prod_{i=1}^{q} p_{i,q}^{\alpha_q - 1} = \lambda_e \sum_j \frac{\alpha_j}{S}(\psi(S+1) - \psi(\alpha_j + 1))$$

where $\psi$ is the digamma function and $\lambda_e$ is a scalar weight that controls the strength of the entropy component. Embodiments can sum over classes j in the same class level (e.g., base, composite with two classes, composite with three classes, etc.). An intent of the entropy term can include discouraging splitting probability mass between states, which is encouraged by the target vector for the composite classes.

Using Stochastic Gradient Descent (SGD), or a similar technique, weights can be adjusted to reduce (e.g., minimize) a total cost by following an averaged direction of a steepest descent along a cost surface. If the entropy component is too large, the steepest gradient points to a class with probability of one. If the system 100 chose to follow a first path to a first class for one image of $x_1$ and a second path to a second class for another image of $x_1$, the averaged direction points directly in the center towards a higher cost at an equal probability of both the first and second classes. In this case, all images with base class $x_1$ will only have probability mass in either the first class or the second class. If the entropy component is too small, the lowest cost corresponds to a perfect split of the two probability classes, which provides conflicting information. If the entropy is adjusted correctly, weights are adjusted to allow for multiple possible distributions for probability mass in the composite classes. This encourages model parameters that split probability amongst composite classes based upon specific features of each image.

The KL divergence in the cost function can be defined as $$\mathbb{E}_{p \sim D(p|\alpha)}[KL(D(p_i|\alpha'_i) \| D(p_i|\alpha_i = Na_i))] =$$

$$\lambda_{KL}\left( \log\left[ \frac{\Gamma(\sum_{j=1}^{k} \alpha'_{ij})\left[\prod_{m=1}^{N-1} \Gamma(m)^{\binom{N}{m}}\right]}{\Gamma(N(2^{N-1}-1))\prod_{j=1}^{k} \Gamma(\alpha'_{ij})} \right] + \sum_{j=1}^{k} (\alpha'_{ij} - Na_{ij})\left[ \psi(\alpha'_{ij}) - \psi\left(\sum_{j=1}^{k} \alpha'_{ij}\right) \right] \right)$$

Here $\lambda_{KL}$ controls the strength of the KL divergence, $\alpha_i = Na_i$ characterizes the state of complete uncertainty (e.g., u=1, $e_{ij} = 0 \forall j$), and $a'_i$ is the misleading evidence. The misleading evidence constitutes all the evidence towards the incorrect base class or composite classes for a particular image. The misleading evidence can be defined as $$\alpha'_i = e_i \circ (1 - y_{ev,i}) + Na_i$$

where $y_{ev,i}$ is a binary vector that is 1 for all relevant classes for an image, as described by the target vector $y_i \geq 0$, and 0 for all incorrect classes. The KL divergence drives the misleading evidence towards zero and preserves all evidence towards the correct base class or relevant composite classes.

To illustrate the effect of the KL divergence, consider the case of three bases classes $x_1$, $x_2$, $x_3$. The misleading evidence for an image with base class $x_1$ with evidence vector $e_i = (4,4,4,4,4,4)$ and $y_{ev,i} = (1,0,0,1,1,0)$ can be $$\alpha'_i = (4,4,4,4) \circ (0,1,1,0,0,1) + (1,1,1,2,2,2) = (0,4,4,0,0,4) + (1,1,1,2,2,2) = (1,5,5,2,2,6)$$

The corresponding state of complete uncertainty (e.g., no evidence) can be $\alpha_i = Na_i = (1,1,1,2,2,2)$. By comparing $\alpha'_i$ with $\alpha_i = Na_i$ (e.g., u=1 case), it can be seen that the misleading evidence only contains evidence in the incorrect base classes $x_2$ and $x_3$ and the single composite class $x_2$ or $x_3$. The evidence in the correct base class $x_1$ and the relevant composite classes $x_1$ or $x_2$ and $x_1$ or $x_3$ has been effectively removed in $a'_i$. Since the KL divergence is with respect to the misleading evidence and the state of uncertainty, only the evidence in the incorrect classes is reduced (e.g., minimized). However, the evidence in the correct classes is not reduced.

The final component of the cost function penalizes uncertainty over the relevant composite classes, $$L_{u,i} = \lambda_u \left( \frac{u}{\text{prob. relevant composite classes}} \right)$$

where $\lambda_u$ is adjusted to balance the values of uncertainty. Without this penalty, the network can provide classification of "uncertain" over any of the composite classes.

The parameters in the cost function can be further adjusted to ensure that the model yields high accuracy. In some neural network architectures, a successful classification occurs when the class with the highest probability describes the actual class of the image. Successful performance for embodiments is different than standard neural network architectures, since the composite classes do not directly relate to the actual class of the image. In embodiments, the probability masses can be projected onto the N base classes $\mathbb{X}$. For a single image $x_m$, the corresponding projected probability can be $$P_m = \sum_{j=1}^{k} \frac{\alpha(x_m \text{ and } x_j)}{a_j} b_j + a_m u$$

where $$b_j = \frac{e_j}{s}$$

is the belief and $a(x_m \text{ and } x_j)$ is the base rate for the shared set elements between class $x_m$ and $x_j$. For example, $$a(x_1 \text{ and } x_{1 or 2}) = a_1 = \frac{1}{3}.$$

In the case of three base classes $x_1$, $x_2$, $x_3$ the projected probabilities can be $$P_1 = b_1 + \frac{1}{2}(b_{1or2} + b_{1or3}) + \frac{1}{3}u$$

$$P_2 = b_2 + \frac{1}{2}(b_{1or2} + b_{2or3}) + \frac{1}{3}u$$

$$P_3 = b_3 + \frac{1}{2}(b_{1or3} + b_{1or3}) + \frac{1}{3}u$$

The projected probabilities can satisfy sub-additivity for probabilities $$\sum_{m \in \mathbb{X}} P_m = \sum_{j=1}^{k} b_j + u = 1$$

A successful classification occurs when the base class with the highest projected probability describes the actual class of the image. Accuracy, a, can be defined as the percent of successful classifications in a set of images.

To test the system 100, objects to be identified 102 in the form of images of the numbers "0", "2", and "5" from the MNIST dataset were used. The parameter values used to generate the results are presented in Table I. The network was run for 50 epochs on TensorFlow with the Adam Optimizer with a learning rate of η=0.001 and achieved an accuracy of 99.9% and 99.5% on the training and validation sets, respectively. Testing of the system 100 was performed on the system with rotated images of "0", "2", and "5".

TABLE 1

Parameter Values for Training the System 100

| Parameter | Value(s) |
|---|---|
| Least Squares Parameter $\lambda_i$ | $\lambda_i = (1, 1, 1, 0.7, 0.7, 0.7)$ |
| Entropy Parameter $\lambda_e$ | $\lambda_e = 0.1425$ |
| Uncertainty Parameter $\lambda_u$ | $\lambda_u = 0.15$ |
| KL Divergence Parameter $\lambda_{KL}$ | $\lambda_{KL} = \min\left(1, \frac{\text{global step}}{1000 * \text{number of batches}}\right)$ |

Figure 2:
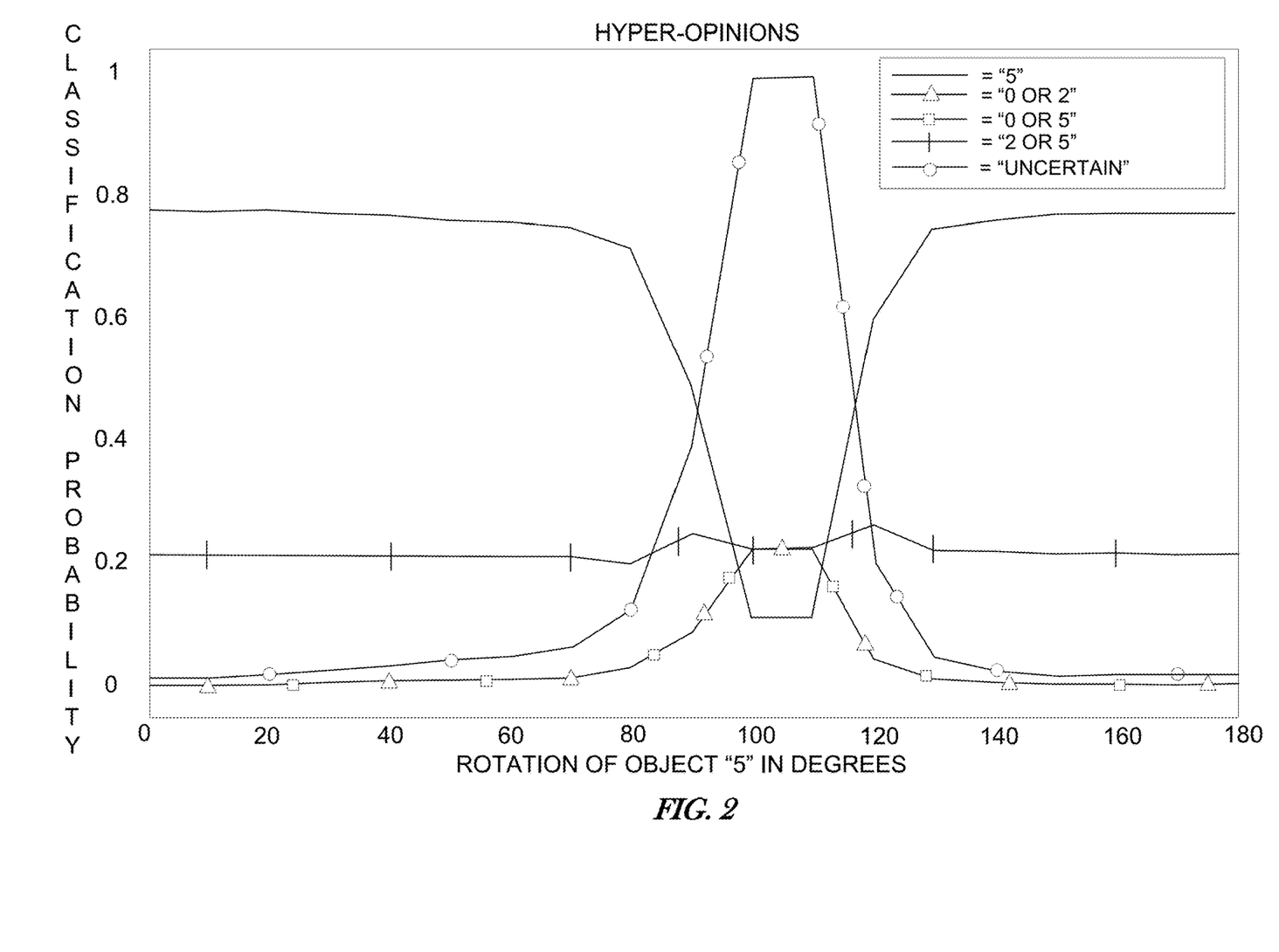
FIG. 2 illustrates, by way of example, a plot of classification probability vs rotation of object for images of the object "5" using embodiments herein.

FIG. 2 illustrates, by way of example, a plot of classification probability vs rotation of object for images of the object "5" using embodiments herein. The classification probability illustrated is expected probabilities, $\hat{p}_j$, for each of the classes and uncertainty as an image of "5" is rotated. Only the expected probabilities that reach a threshold probability of 0.20 at least once are plotted. All the expected probabilities sum to unity by the definition of $\hat{p}_j$. In its original orientation, the largest probabilities are for the base class "5", $p_5$=0.79 and composite class "2 OR 5", $p_{2or5}$=0.21, and uncertainty is zero. Probability mass redistributes to all three of the composite classes and uncertainty increases as the "5" is rotated. The state of complete uncertainty occurs at 100° and 110°. At these points, the expected probabilities for the composite classes are uniformly ⅔ and for the base classes are uniformly ⅓. This result is expected since the theory predicts that $\alpha_i$=(1,1,1,2,2,2) and $\hat{p}_j$=⅑(1,1,1,2,2,2) at the state of complete uncertainty. The uncertainty decreases and the probability mass redistributes to the base class "5".

Figure 3:
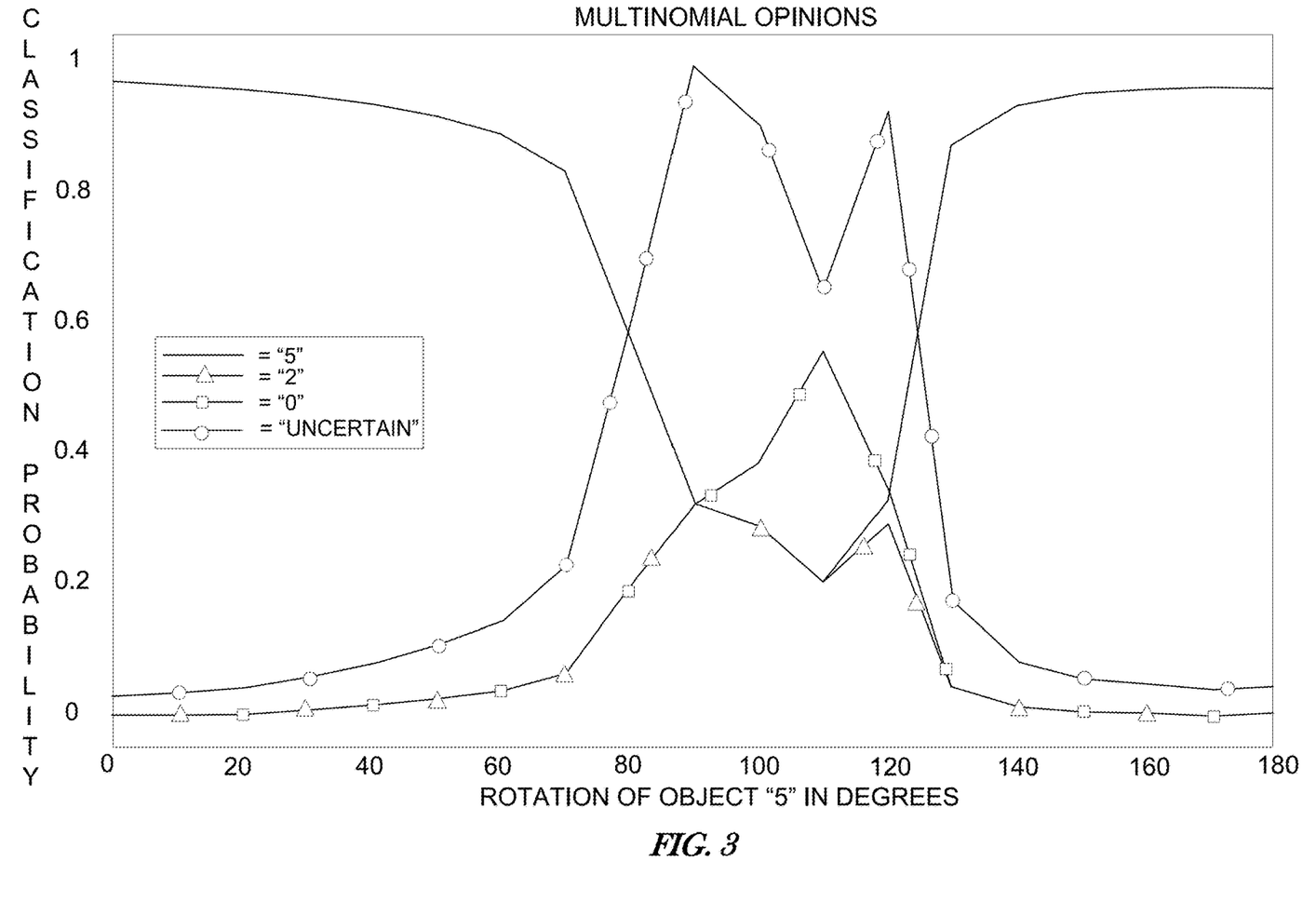
FIG. 3 illustrates, by way of example, a plot of classification probability vs rotation of object for the same images of the object "5" as in FIG. 2, but using multinomial opinions.

FIG. 3 illustrates, by way of example, a plot of classification probability vs rotation of object for the same images of the object "5" as in FIG. 2, but using multinomial opinions. This plot is provided to put these results in perspective and highlight improvements over multinomial opinions. FIG. 3 shows the expected probabilities, $\hat{p}_j$ for each of the classes and the uncertainty for the same images of the object "5" that were used to generate the plot of FIG. 2. At the image's original orientation, the probability of the base class "5" is larger, $p_5$=0.97, than that determined using embodiments herein. This is expected because the probability mass can only be distributed in the base classes in multinomial opinions. The region of moderate uncertainty is much wider in the multinomial opinions plot. The base class probabilities are also larger in regions of uncertainty since the probability mass cannot redistribute into any composite classes. Additionally, the multinomial opinion network makes a slightly confident prediction of "0" at a rotation of 110° (the confidence level here is defined as c=1−u).

Figure 4:
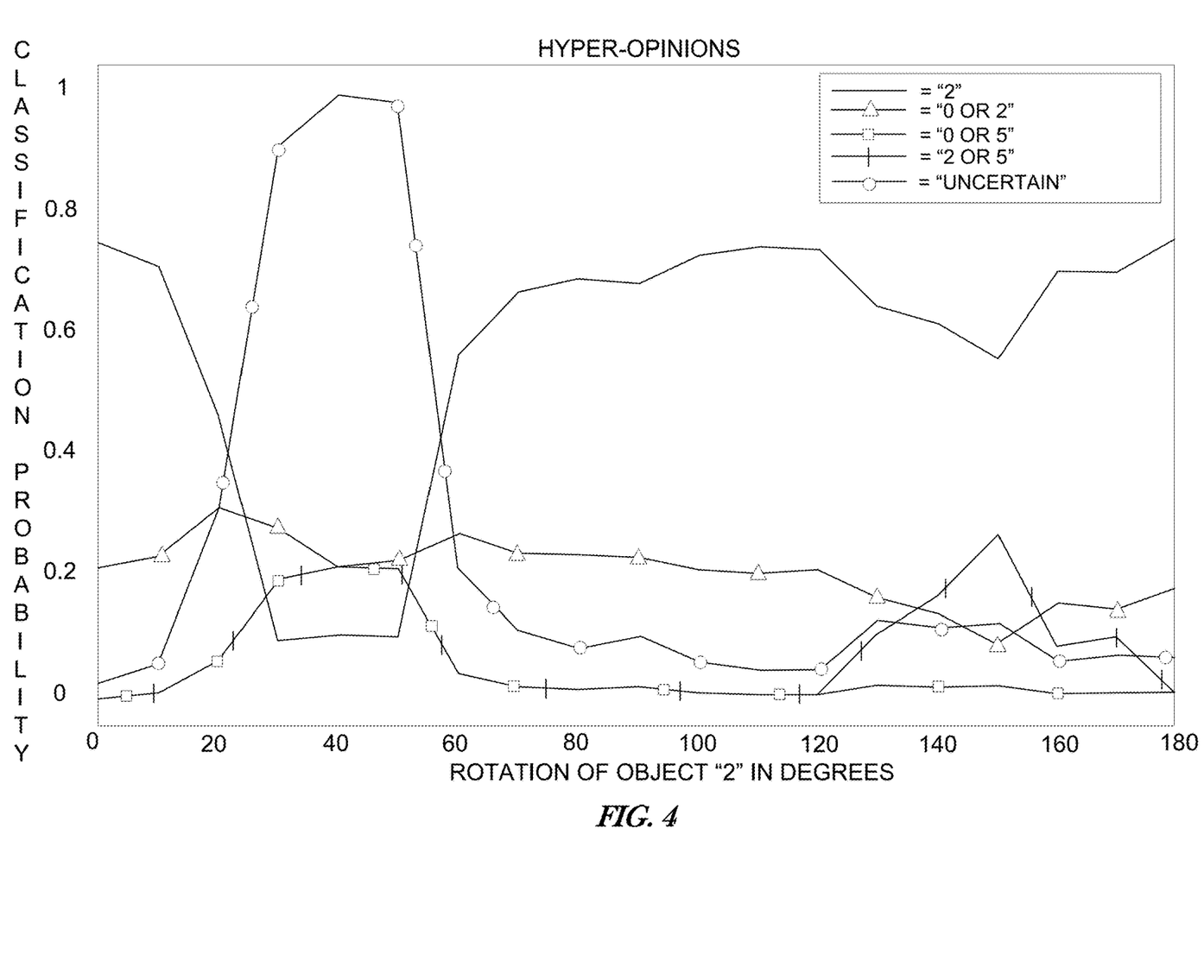
FIGS. 4 and 5 illustrate, by way of example, plots of classification probability vs object rotation for images of the object "2" using embodiments herein and multinomial opinions, respectively.
Figure 5:
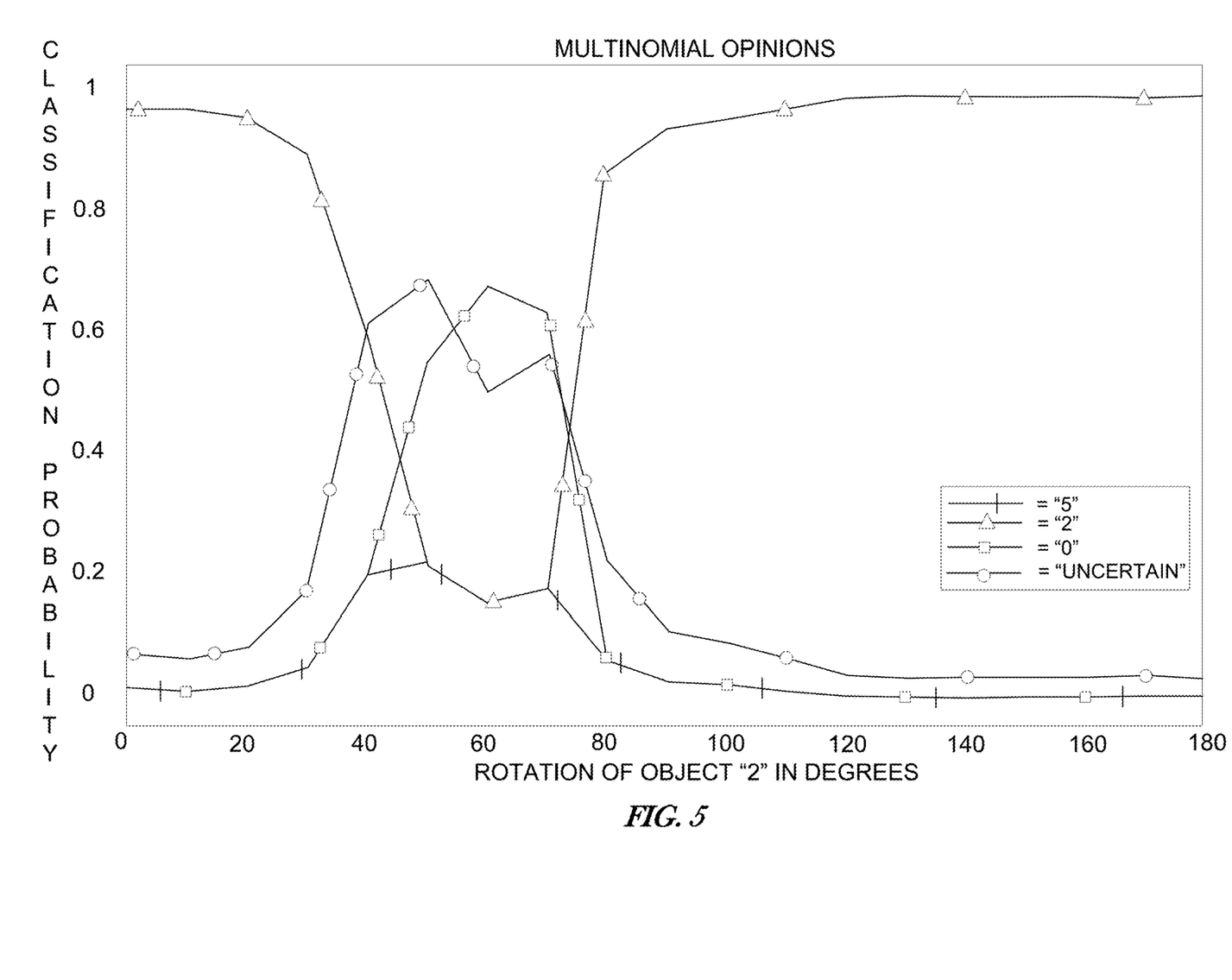

FIGS. 4 and 5 illustrate, by way of example, plots of classification probability vs object rotation for images of the object "2" using embodiments herein and multinomial opinions, respectively. These FIGS. show that the base class probability in the "2" class is larger in the multinomial opinion approach than embodiments herein through any rotation. For example, at 0°, the probability in base class "2" is $p_2$=0.94 in the multinomial approach and $p_2$=0.76 in embodiments. However, the probability mass is also distributed in the composite class "0 OR 2" with probability $p_{0or2}$=0.22 at this orientation. Combining these two expected probabilities at 0° using the projected probability in the base class "2" gives $p_2$=0.89; this is very close to the multinomial opinion prediction in the base class "2". Additionally, our approach features a much more localized region of uncertainty than the multinomial opinion approach. Whereas embodiments better discern when it can no longer classify the object, the multinomial opinion approach tends to be more overconfident with larger base class probabilities throughout regions of higher uncertainty. For example, at 60° the probability in the incorrect base class "0" is $p_0$=0.67 with an uncertainty of 0.50 in the multinomial opinion approach, whereas the highest probability in the correct base class "2" $p_2$=0.58 with an uncertainty of 0.21 using embodiments herein.

Figure 6:
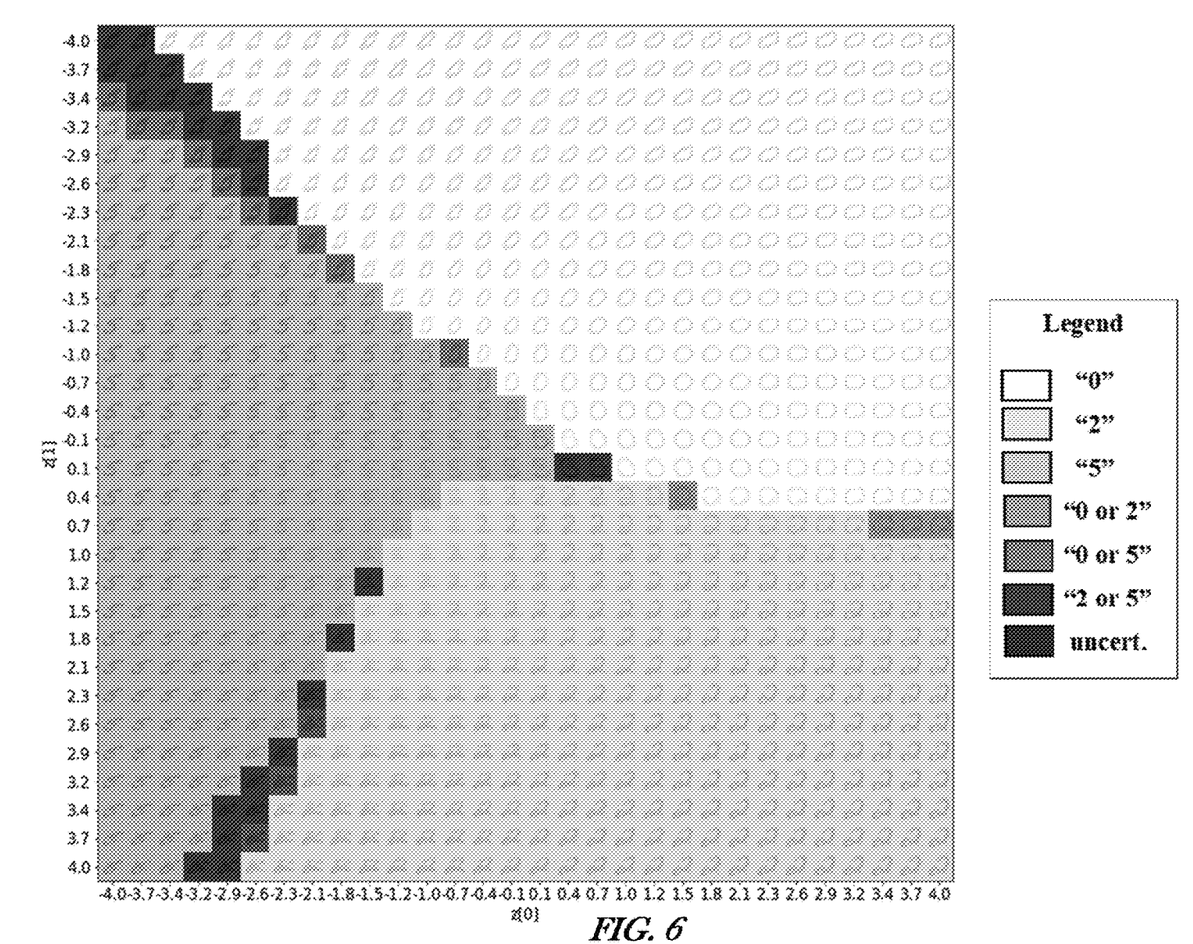
FIG. 6 illustrates, by way of example, a plot of images generated from a variational autoencoder (VAE) and a corresponding classification.

FIG. 6 illustrates, by way of example, a plot of images generated from a variational autoencoder (VAE) and a corresponding classification. A VAE performs generative modeling by learning distributions of latent variables from training data and generating new data by sampling from the learned distributions. Using the VAE, one can interpolate between images of the objects "0", "2", and "5" by decoding a two-dimensional latent variable z from [−4,4]. FIG. 6 presents a grid of the generated images from the VAE with varying z. Each of the digits are separated into distinct clusters based on their z values. The color scheme is described in the legend and corresponds to the maximum prediction probability produced by the system 100. Here we included uncertainty as an additional prediction category in case that the uncertainty measurement is larger than any of the prediction probabilities. This figure clearly shows that the system 100 can predict each of the base classes within the cluster bulk for each digit. Along the boundaries of each cluster, the system 100 chooses either the appropriate composite class or uncertainty.

The deep-learning implementation of Hyper-Opinions in embodiments is a novel approach for object classification that directly calculates the degree of prediction uncertainty. Embodiments are the only technique that can classify with the logical "OR" (e.g., class A OR B) with a single classifier and at a same hierarchy as the base classes for three or more bases classes. The network's performance on the rotating digits demonstrates that it outperforms the deep-learning implementation of multinomial opinions. Not only can embodiments reduce overconfident incorrect decisions, they can also reduce regions of uncertainty. Classification performance of embodiments on the grid of digits generated from the VAE illustrates that the network can sense out the boundaries of borderline cases and assign these images with either the correct base class, relevant composite classes, or uncertainty.

Figure 7:
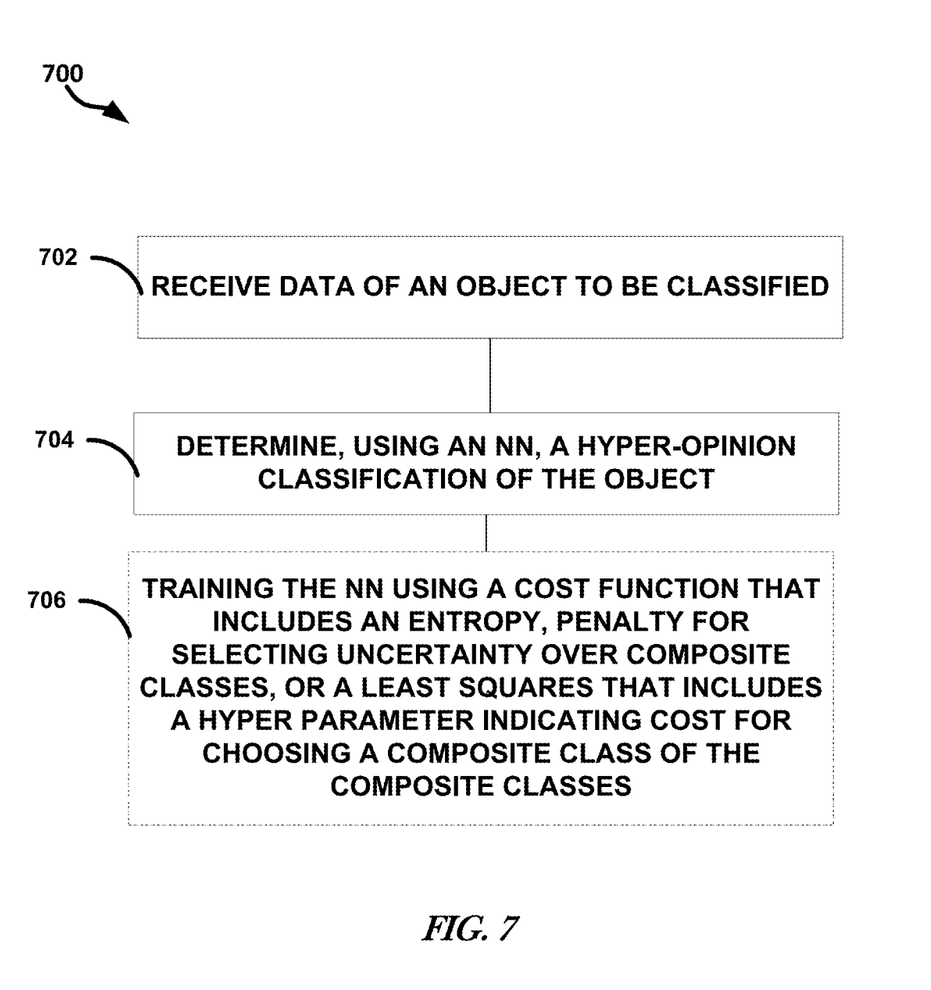
FIG. 7 illustrates, by way of example, a diagram of an embodiment of a method for object classification.

FIG. 7 illustrates, by way of example, a diagram of an embodiment of a method 700 for object classification. The method 700 as illustrated includes receiving data of an object to be classified, at operation 702, and determining, using a neural network, a hyper-opinion classification of the object including an indication of the probabilities of base classes and composite classes that are "or" combinations of proper subsets of the base classes, at operation 704, and optionally training the neural network using a cost function that includes an entropy, penalty for selecting uncertainty over composite classes, or a least squares component, at operation 706. The least squares component can include a hyper parameter indicating cost for choosing a composite class of the composite classes.

The method 700 can further include, wherein the cost function includes two or more of an entropy component, a penalty for selecting uncertainty over the composite classes, or a least squares component that includes a hyper parameter indicating cost for choosing a composite class of the composite classes. The method 700 can further include, wherein the cost function includes all three of: an entropy component, a penalty for selecting uncertainty over the composite classes, and a least squares component that includes a hyper parameter indicating cost for choosing a composite class of the composite classes.

The method 700 can further include, wherein a target vector for training the neural network includes dependence of the composite classes on the base classes. The method 700 can further include, wherein the neural network includes an output layer that implements a soft+ function to determine the classification. The method 700 can further include, wherein training the neural network includes projecting composite class probabilities and combining the projected composite class probabilities with base class probabilities to determine classification accuracy and backpropagating error based on the classification accuracy.

Figure 8:
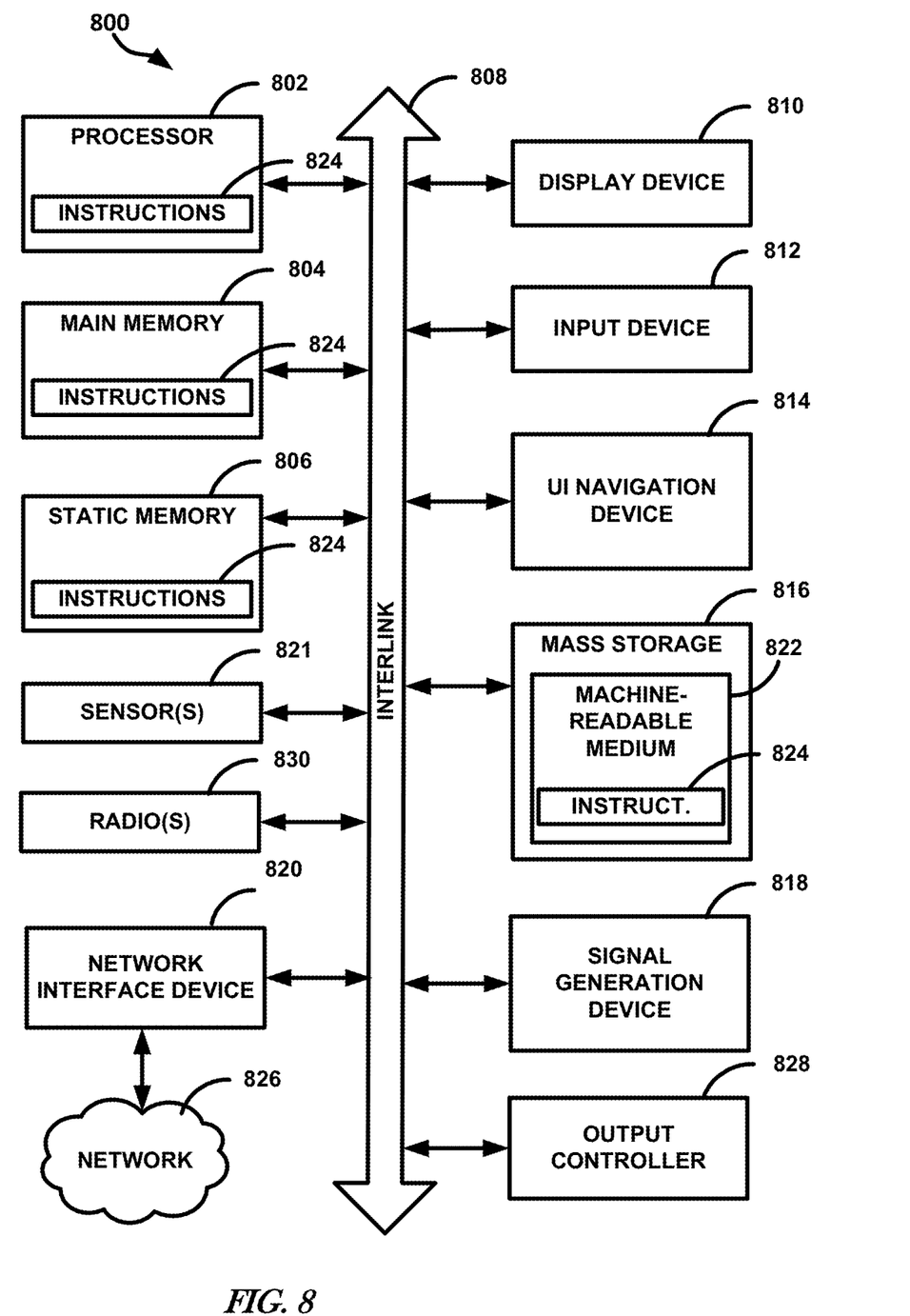
FIG. 8 illustrates, by way of example, a block diagram of an embodiment of a machine in the example form of a machine within which instructions, for causing the machine to perform any one or more of the methodologies discussed herein, may be executed.

FIG. 8 illustrates, by way of example, a block diagram of an embodiment of a machine in the example form of a computer system 800 within which instructions, for causing the machine to perform any one or more of the methodologies discussed herein, may be executed. One or more components or operations of the system 100 or method 700 can be implemented or performed by the computer system 800. In alternative embodiments, the machine 800 operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 821 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 804 and a static memory 806, which communicate with each other via a bus 808. The memory 804, 806 can store parameters (sometimes called weights) that define operations the system 100 or method 700. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker), a network interface device 820, and radios 830 such as Bluetooth, WWAN, WLAN, and NFC, permitting the application of security controls on such protocols.

The machine as illustrated includes an output controller 828. The output controller 828 manages data flow to/from the machine 800. The output controller 828 is sometimes called a device controller, with software that directly interacts with the output controller 828 being called a device driver.

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804, the static memory 806, and/or within the processor 802 during execution thereof by the machine 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

ADDITIONAL NOTES AND EXAMPLES

Example 1 includes a method for classifying an object, the method comprising receiving data of an object to be classified, and determining, using a neural network, a hyper-opinion classification of the object including an indication of the probabilities of base classes and composite classes that are "or" combinations of proper subsets of the base classes.

In Example 2, Example 1 can further include, wherein the neural network is trained using a cost function that includes one or more of an entropy component, a penalty for selecting uncertainty over the composite classes, or a least squares component that includes a hyper parameter indicating cost for choosing a composite class of the composite classes.

In Example 3, Example 2 can further include, wherein the cost function includes two or more of an entropy component, a penalty for selecting uncertainty over the composite classes, or a least squares component that includes a hyper parameter indicating cost for choosing a composite class of the composite classes.

In Example 4, Example 3 can further include, wherein the cost function includes all three of: an entropy component, a penalty for selecting uncertainty over the composite classes, and a least squares component that includes a hyper parameter indicating cost for choosing a composite class of the composite classes In Example 5, at least one of Examples 1-4 can further include, wherein a target vector for training the neural network includes dependence of the composite on the base classes.

In Example 6, at least one of Examples 1-5 can further include, wherein the neural network includes an output layer that implements a soft+ function to determine the classification.

In Example 7, at least one of Examples 1-6 can further include, wherein training the neural network includes projecting composite class probabilities and combining the projected composite class probabilities with base class probabilities to determine classification accuracy and backpropagating error based on the classification accuracy.

Example 8 includes a non-transitory machine-readable medium including instructions that, when executed by a machine, cause the machine to perform operation for classifying an object, the operations comprising receiving data of an object to be classified, and determining, using a neural network, a hyper-opinion classification of the object including an indication of the probabilities of base classes and composite classes that are "or" combinations of proper subsets of the base classes.

In Example 9, Example 8 can further include, wherein the neural network is trained using a cost function that includes one or more of an entropy component, a penalty for selecting uncertainty over the composite classes, or a least squares component that includes a hyper parameter indicating cost for choosing a composite class of the composite classes.

In Example 10, Example 9 can further include, wherein the cost function includes two or more of an entropy component, a penalty for selecting uncertainty over the composite classes, or a least squares component that includes a hyper parameter indicating cost for choosing a composite class of the composite classes.

In Example 11, Example 10 can further include, wherein the cost function includes all three of: an entropy component, a penalty for selecting uncertainty over the composite classes, and a least squares component that includes a hyper parameter indicating cost for choosing a composite class of the composite classes In Example 12, at least one of Examples 8-11 can further include, wherein a target vector for training the neural network includes dependence of the composite on the base classes.

In Example 13, at least one of Examples 8 can further include, wherein the neural network includes an output layer that implements a soft+ function to determine the classification.

In Example 14, at least one of Examples 8-13 can further include, wherein training the neural network includes projecting composite class probabilities and combining the projected composite class probabilities with base class probabilities to determine classification accuracy and backpropagating error based on the classification accuracy.

Example 15 includes a system for classifying an object, the system comprising a memory including data specifying parameters of a neural network stored thereon, processing circuitry configured to receive data of an object to be classified, and determine, by executing the neural network on the received data, a hyper-opinion classification of the object including an indication of the probabilities of base classes and composite classes that are "or" combinations of proper subsets of the base classes.

In Example 16, Example 15 can further include, wherein the neural network parameters are trained using a cost function that includes one or more of an entropy component, a penalty for selecting uncertainty over the composite classes, or a least squares component that includes a hyper parameter indicating cost for choosing a composite class of the composite classes.

In Example 17, Example 16 can further include, wherein the cost function includes two or more of an entropy component, a penalty for selecting uncertainty over the composite classes, or a least squares component that includes a hyper parameter indicating cost for choosing a composite class of the composite classes.

In Example 18, Example 17 can further include, wherein the cost function includes all three of: an entropy component, a penalty for selecting uncertainty over the composite classes, and a least squares component that includes a hyper parameter indicating cost for choosing a composite class of the composite classes In Example 19, at least one of Examples 15-18 can further include, wherein a target vector for training the neural network includes dependence of the composite on the base classes.

In Example 20, at least one of Examples 15-19 can further include, wherein training the neural network includes projecting composite class probabilities and combining the projected composite class probabilities with base class probabilities to determine classification accuracy and backpropagating error based on the classification accuracy.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for classifying an object, the method comprising:
   receiving data of an object to be classified; and
   determining, using a neural network trained using a target vector that includes dependence of a composite class on base classes included in the composite class, a hyper-opinion classification of the object including an indication of the probabilities of base classes and the composite class, the composite class is an "or" combination of a proper subset of the base classes.

2. The method of claim 1, wherein the neural network is trained using a cost function that includes one or more of an entropy component, a penalty for selecting uncertainty over the composite classes, or a least squares component that includes a hyper parameter indicating cost for choosing a composite class of the composite classes.

3. The method of claim 2, wherein the cost function includes two or more of an entropy component, a penalty for selecting uncertainty over the composite classes, or a least squares component that includes a hyper parameter indicating cost for choosing a composite class of the composite classes.

4. The method of claim 3, wherein the cost function includes all three of: an entropy component, a penalty for selecting uncertainty over the composite classes, and a least squares component that includes a hyper parameter indicating cost for choosing a composite class of the composite classes.

5. The method of claim 1, wherein a target vector for training the neural network includes, for each composite class entry in the target vector, a denominator that equals the number of base classes in the composite class, the target vector including respective base class entries for each base class of the base classes and composite class entries for each composite class of the composite classes, a given composite class entry of the composite class entries is non-zero if a corresponding base class entry of any of the base classes of the given composite is non-zero and is zero otherwise.

6. The method of claim 1, wherein the neural network includes an output layer that implements a soft+ function to determine the classification.

7. The method of claim 1, wherein training the neural network includes projecting composite class probabilities and combining the projected composite class probabilities with base class probabilities to determine classification accuracy and backpropagating error based on the classification accuracy.

8. A non-transitory machine-readable medium including instructions that, when executed by a machine, cause the machine to perform operation for classifying an object, the operations comprising:
   receiving data of an object to be classified; and
   determining, using a neural network trained using a target vector that includes dependence of a composite class on base classes included in the composite class, a hyper-opinion classification of the object including an indication of the probabilities of base classes and the composite class, the composite class is an "or" combination of a proper subset of the base classes.

9. The non-transitory machine-readable medium of claim 8, wherein the neural network is trained using a cost function that includes one or more of an entropy component, a penalty for selecting uncertainty over the composite classes, or a least squares component that includes a hyper parameter indicating cost for choosing a composite class of the composite classes.

10. The non-transitory machine-readable medium of claim 9, wherein the cost function includes two or more of an entropy component, a penalty for selecting uncertainty over the composite classes, or a least squares component that includes a hyper parameter indicating cost for choosing a composite class of the composite classes.

11. The non-transitory machine-readable medium of claim 10, wherein the cost function includes all three of: an entropy component, a penalty for selecting uncertainty over the composite classes, and a least squares component that includes a hyper parameter indicating cost for choosing a composite class of the composite classes.

12. The non-transitory machine-readable medium of claim 8, wherein a target vector for training the neural network includes, for each composite class entry in the target vector, a denominator that equals the number of base classes in the composite class, the target vector including respective base class entries for each base class of the base classes and composite class entries for each composite class of the composite classes, a given composite class entry of the composite class entries is non-zero if a corresponding base class entry of any of the base classes of the given composite is non-zero and is zero otherwise.

13. The non-transitory machine-readable medium of claim 8, wherein the neural network includes an output layer that implements a soft+ function to determine the classification.

14. The non-transitory machine-readable medium of claim 8, wherein training the neural network includes projecting composite class probabilities and combining the projected composite class probabilities with base class probabilities to determine classification accuracy and backpropagating error based on the classification accuracy.

15. A system for classifying an object, the system comprising:
   a memory including data specifying parameters of a neural network stored thereon;
   processing circuitry configured to:
   receive data of an object to be classified; and
   determine, by executing the neural network on the received data, the neural network trained using a target vector that includes dependence of a composite class on base classes included in the composite class, a hyper-opinion classification of the object including an indication of the probabilities of base classes and the composite class, the composite class is an "or" combination of a proper subset of the base classes.

16. The system of claim 15, wherein the neural network parameters are trained using a cost function that includes one or more of an entropy component, a penalty for selecting uncertainty over the composite classes, or a least squares component that includes a hyper parameter indicating cost for choosing a composite class of the composite classes.

17. The system of claim 16, wherein the cost function includes two or more of an entropy component, a penalty for selecting uncertainty over the composite classes, or a least squares component that includes a hyper parameter indicating cost for choosing a composite class of the composite classes.

18. The system of claim 17, wherein the cost function includes all three of: an entropy component, a penalty for selecting uncertainty over the composite classes, and a least squares component that includes a hyper parameter indicating cost for choosing a composite class of the composite classes.

19. The system of claim 15, wherein a target vector for training the neural network includes, for each composite class entry in the target vector, a denominator that equals the number of base classes in the composite class, the target vector including respective base class entries for each base class of the base classes and composite class entries for each composite class of the composite classes, a given composite class entry of the composite class entries is non-zero if a corresponding base class entry of any of the base classes of the given composite is non-zero and is zero otherwise.

20. The system of claim 15, wherein training the neural network includes projecting composite class probabilities and combining the projected composite class probabilities with base class probabilities to determine classification accuracy and backpropagating error based on the classification accuracy.

* * * * *